April 14, 1931.　　A. C. CHRISTOPHERSON　　1,800,209
IMPLEMENT FOR MARKING OBJECTS
Filed May 17, 1924　　3 Sheets-Sheet 2
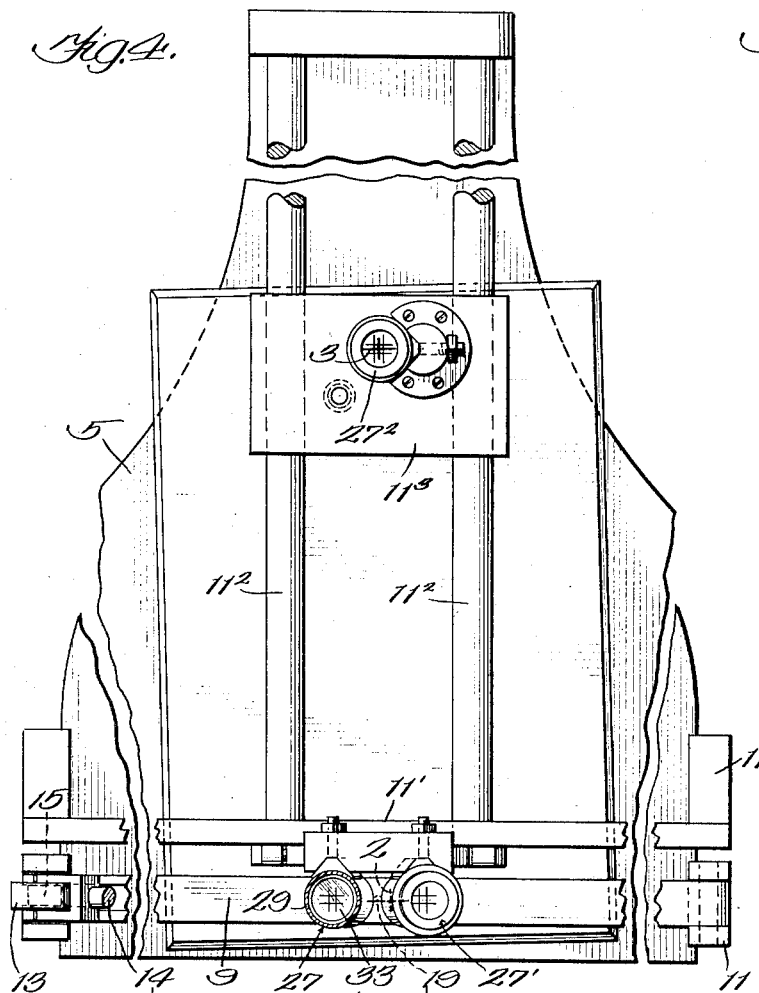
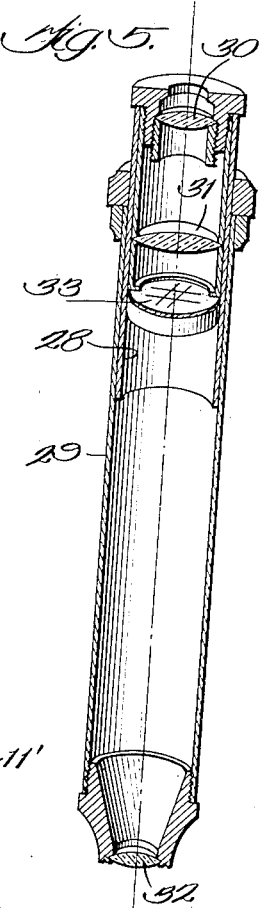
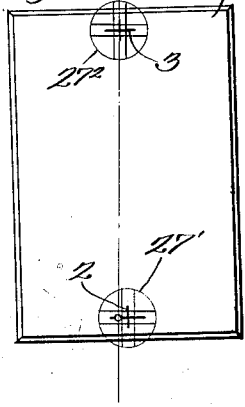
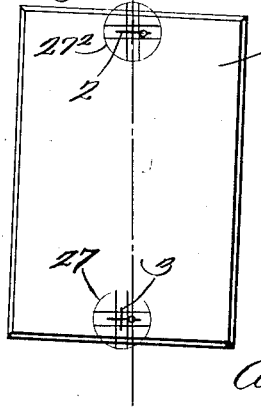
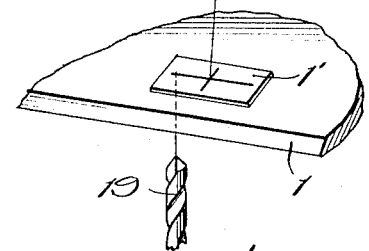
Inventor:
Alfred C. Christopherson
By G. A. Bragg Atty.

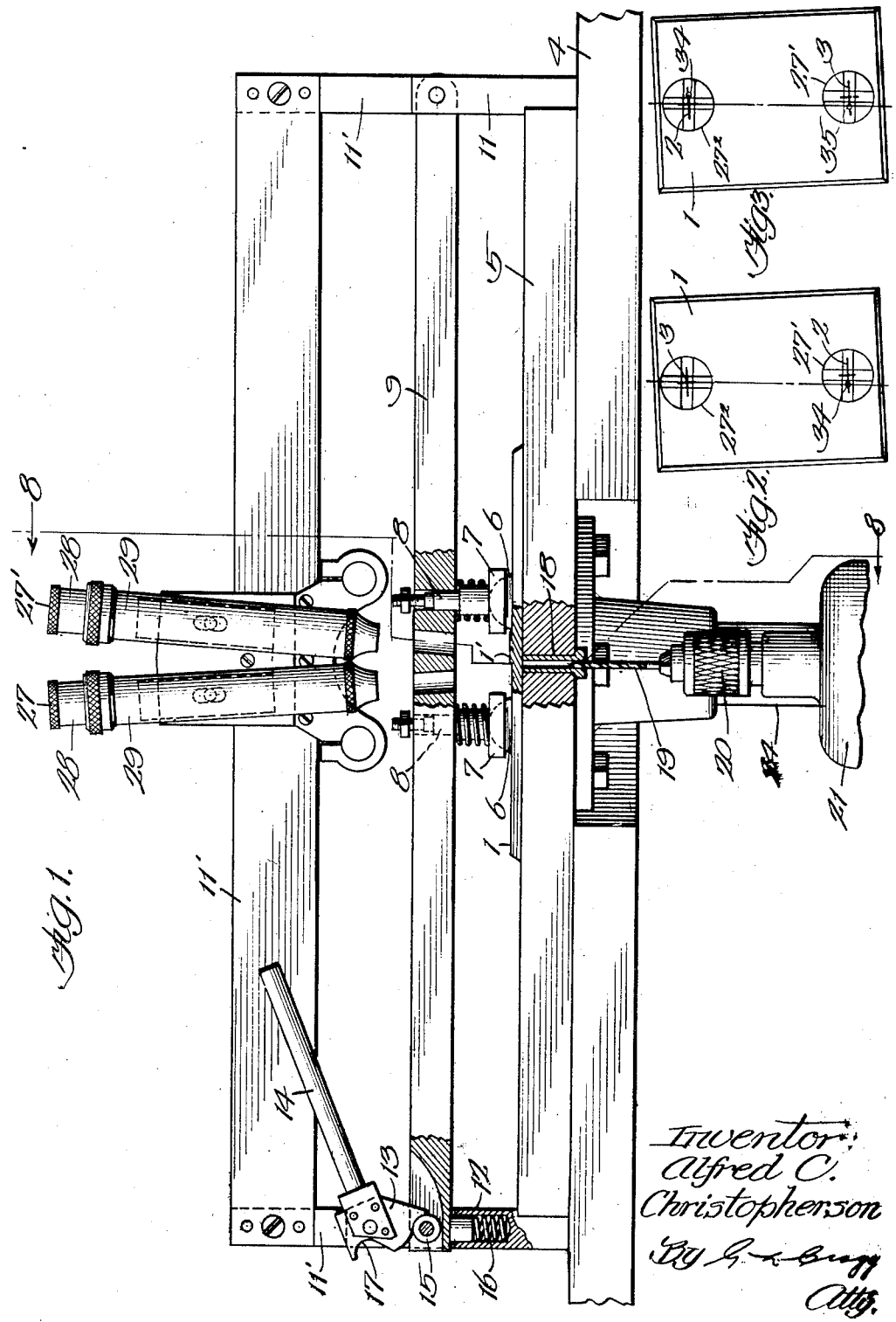

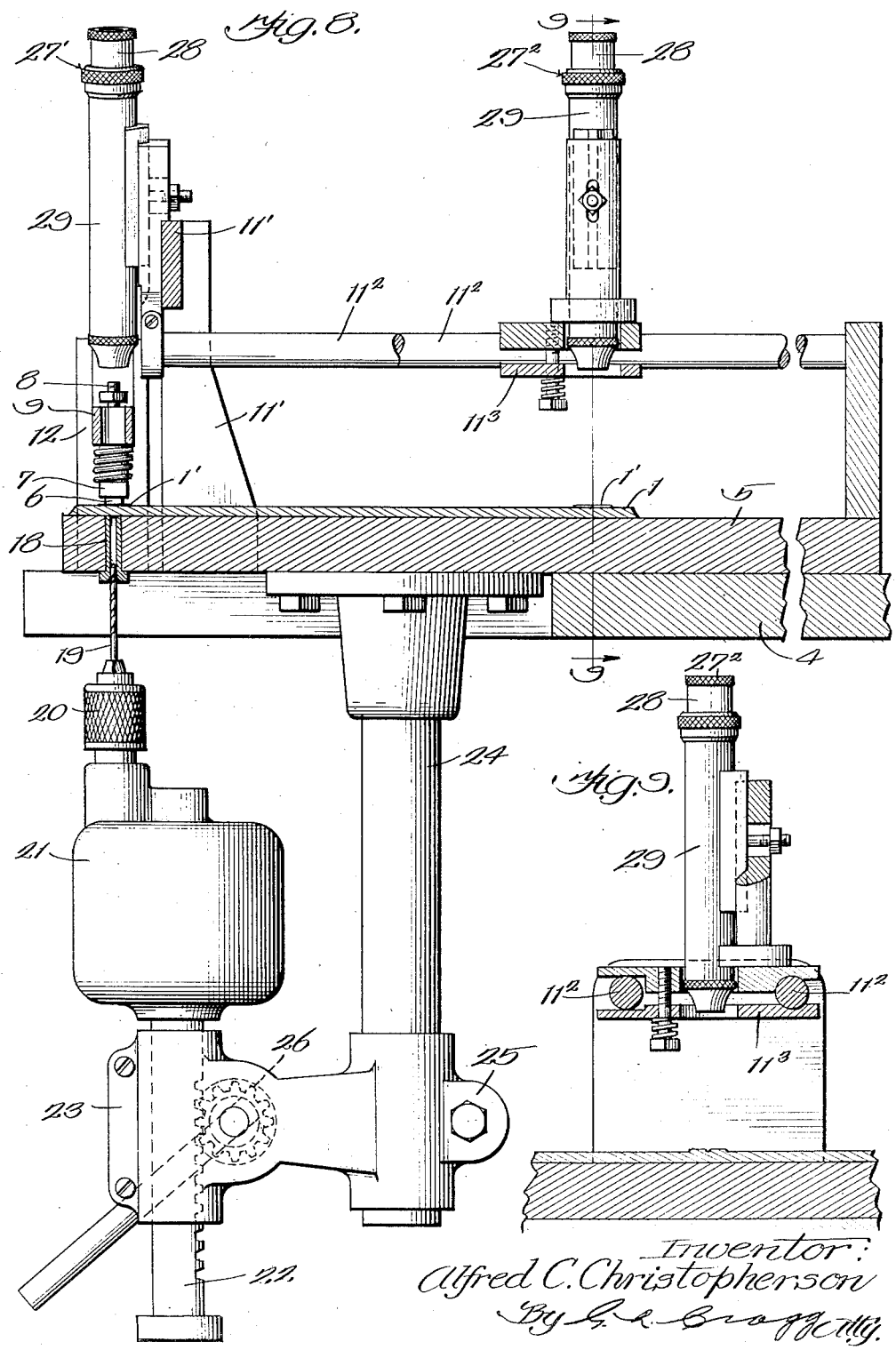

Patented Apr. 14, 1931

1,800,209

UNITED STATES PATENT OFFICE

ALFRED C. CHRISTOPHERSON, OF CHICAGO, ILLINOIS, ASSIGNOR TO HACKER MANUFACTURING CO., OF CHICAGO, ILLINOIS, A CORPORATION OF ILLINOIS

IMPLEMENT FOR MARKING OBJECTS

Application filed May 17, 1924. Serial No. 714,056.

My invention relates to an apparatus for marking objects and is very usefully employed in providing a series of color printing plates with equally spaced marks in order that the plates may be successively imposed in exactly the same place upon a printing bed or form whereby the printing, in different colors, effected from said plates upon the same print, will be in exact register.

The marking implement of my invention includes one or more marking gauges in normally fixed relation with and located at a marking element and preferably so disposed as to be out of line with the marking element, and, preferably, out of line with the marks produced thereby, for a purpose which will appear, though the invention is not to be thus limited. Either or both the mechanism for operating the marking device, which is preferably a drill, and a guide therefor, has fixed relation with the adjacent gauge or gauges. In the preferred embodiment of the invention, each sighting gauge is in the form of a microscope having an index within it that is in line with the sighting opening. The plate to be drilled is shifted until an index upon the plate that aids in determining the intended location for the hole through the plate and is preferably upon one side of this location is brought into line with the index and sighting opening of a gauge which is located at the drill. By producing a hole in the plate that is upon one side of an index on the plate, this index will not be obliterated but may be used in locating another hole with the aid of another microscope adjacent the drill and suitably placed with respect to the drill and the first microscope, or this first microscope may be given another position for this purpose. A third or additional microscope is desirably located at the rear of the implement and cooperates with another index upon the plate to insure the absolutely correct location of the plate upon its supporting bed. This additional microscope may be perpendicular to the bed.

The invention will be more fully explained in connection with the accompanying drawings in which Fig. 1 is a front view, with parts broken away and shown in section, of the preferred embodiment of my invention; Figs. 2 and 3 are diagrammatic views illustrating one relation of a plate and two gauges; Fig. 4 is a plan view; Fig. 5 is a perspective view of the preferred form of sighting device shown in longitudinal section, together with the drill and a plate diagrammatically illustrated; Figs. 6 and 7 diagrammatically illustrate another relationship of two gauges and a plate; Fig. 8 is a sectional view on line 8—8 of Fig. 1; and Fig. 9 is a sectional view on line 9—9 of Fig. 8.

The printing plates 1 that are to be drilled are provided with marks or indices 2, 3, which are at the intersections of crossing lines thereon, placed at each side of the plate. These indices are preferably upon raised portions 1' whose top surfaces are in the plane of the printing surface. There are as many such plates, so marked, as are required in a series for color printing, as will be understood. With the aid of the apparatus of my invention, holes are drilled alongside the indices 2, 3, for receiving pins upon a printing foundation upon which the plates are successively imposed for the successive printing operations, the impressions made by all plates upon each sheet, being, therefore in exact register. By drilling the holes alongside the indices, the indices are not obliterated, but may be used in the location of other holes.

The drilling apparatus illustrated includes a suitably supported foundation member 4 upon which the apparatus is mounted. This foundation carries a rectangular supporting bed 5 that is fixed thereupon and upon which the printing plates of a series are to be successively accurately positioned in exactly the same location for the drilling operations. After being accurately placed, each plate is held down upon the supporting bed by means of the flat presser feet 6 carried by and universally movable in sockets 7. These sockets have stems 8 carried by and movabe crosswise of the arm 9. The springs 10 surround the stems and are interposed between the sockets 7 and the arm 9 pivoted upon the mounting 11 that is fixed upon the foundation member 4 and bed 5. The clamping feet 6 are pressed flat upon the printing plate that is to be held, when the unpivoted end of the arm 9 is held at or against the post 12. I have illustrated a depressing cam 13 carried by the mounting 11 and carrying an operating handle 14, the cam being engageable with a cam roller 15 provided upon the unmounted end of the arm 9. A spring 16 in post 12 presses upwardly against the arm to raise the arm and lift the presser feet when the cam is turned from its arm depressing position, to permit of the insertion, adjustment and removal of the plates that are to be drilled. The arm is desirably held in a raised position by the spring 16, the cam socket 17 receiving the roller 15 to define the extent to which the arm may be raised.

The plate supporting bed 5 carries an upright sleeve 18 whose unthreaded and smooth bore has sliding fit with the upright drill 19, the lower end of the sleeve being preferably flanged and the drill receiving lower end of its bore being flared to direct the drill into the sleeve. This sleeve is located midway between the presser feet, and the drill has a range of upright movement to form the hole through the printing plate. The drill is inserted within a chuck 20 driven by an electric motor 21. This motor is carried upon the upper end of an upright rack 22 which slides through an upright sleeve 23 which is clamped upon a post 24, depending from the bed 5, at any desired place along the post by means of a suitable clamp 25. A pinion 26, having an operating handle 27, is journaled within the clamp 23. By turning the pinion, the drill may be raised while rotating to drill the printing plate and may be lowered to permit substitution of another printing plate in the place of the one drilled or a new adjustment of the latter for another drilling, the arm 9 being raised for this purpose after each drilling operation.

The bed 5 supporting each printing plate that is to be drilled, the drill guide 18 upon this bed and the axis of the operating drill are in fixed relative positions so that when the printing plates of a series are exactly placed upon the bed 5, the holes in these plates will be located in exactly similar positions, insuring exact registry in the prints taken from these plates if the plates are exactly placed in the presses with the aid of exactly placed positioning pins received into the drilled holes. The mechanism 21, 22, 23, 26, for operating the drill normally has a predetermined fixed relationship with the drill guide 18.

The sighting devices are desirably in the form of microscopes 27, 27', 27², each including a tube formed in telescoping sections 28, 29, carrying the usual or suitable lenses 30, 31, 32.

Each microscope tube section 29 is rigidly held upon the mounting 11' that is fixed upon the foundation member 4 and bed 5 whereby the microscope is held in fixed relation with the drill axis and drill guide. The microscopes 27, 27', are disposed at the drill with their axes in the same plane with the drill axis. The microscope 27² is slidably supported upon two rods 11², 11² carried by the mounting 11' and projecting rearwardly from the drill and parallel with the underlying foundation 4 and bed 5. A clamp 11³ holds the microscope 27² rigidly in the selected position and perpendicular to the foundation 4 and bed 5 and the printing plate on the bed. As illustrated in the drawing, the axis of each microscope 27, 27' slants with respect to the drill and the plate support so as to intersect the printing surface of the plate at the indices upon the plate and laterally of the holes produced in the plates. These microscopes are symmetrically positioned. A sighting index carrying glass disc 33 is carried within the tube section 28 of each miscroscope. The sighting index upon the glass disc 33 of each miscroscope is preferably defined by the intersections of two angularly related pairs of parallel lines ground in the disc and is magnified to the observer.

Each of these microscopes 27, 27' or the locations thereof preferably converges downwardly toward the vertical, in order that the holes may be produced close to the indices upon the plate.

In using the implement of my invention with the plate adjustments illustrated in Figs. 2 and 3, microscopes 27' and 27ᵃ are employed, both microscopes being rigidly held with respect to each other and the marking axis of the drill, the axes of these microscopes being spaced apart exactly the distance that is to intervene between the holes 34, 35, that are to be formed in each plate. In arranging to drill the first hole 34 in a plate, the plate is positioned to bring the index 2 in the axis of the slanting microscope 27' and index 3 in the axis of the perpendicular microscope 27², as illustrated in Fig. 2. In arranging to drill the second hole 35, the plate is positioned to bring the index 3 in the axis of microscope 27², as illustrated in Fig. 3. The plate, after each of these adjustments, is held in the manner previously described, whereafter a hole is drilled as set forth. If a mistake is made in accurately locating and drilling a hole, the microscope 27 is employed, or the microscope 27' may be shifted to the position occupied by microscope 27, if it is desired to save the expense of one of these microscopes. The index 2 or 3, that happens to be at the drill is then aligned with the microscope in this position and the other index 3 or 2, is aligned with the perpendicular microscope $27^2$. The holes are then formed upon the other sides of the indices 2, 3. It is to be understood, however, that all plates are, finally, to have holes in exactly the same locations.

If the holes are to be formed in the plate as indicated in Figs. 6 and 7, microscopes 27, $27^2$ are employed as indicated.

When it is stated in the claims that the sighting indices are relatively adjustable to vary the distance therebetween it is intended to mean that either or both of said indices can partake of such movement as is essential to effect desired variation in the distance between the indices. Furthermore, when it is stated in the claims that the marking element is in fixed relation to one of the sighting indices it is intended to mean that the marking element has a constant or fixed operating position with respect to one of the indices although it would of necessity have to move relatively to such index during the operation of marking a plate.

Changes may be made without departing from my invention.

Having thus described my invention, I claim as new:—

1. An implement for marking objects including a bed for supporting objects to be marked, a rail device mounted over the upper face of the bed and in parallel spacement thereto, a carrier slidably adjustable on said rail device, a sighting index mounted on the carrier, a second sighting index mounted above the bed, whereby an object to be marked may be positioned on said bed with the sighting indices, when said carrier is in a given relative adjustment, in visible register respectively and simultaneously with correspondingly spaced apart indices in the object, and a marking element in fixed relation to one of said sighting indices.

2. An implement for marking objects including a bed for supporting objects to be marked, a rail device mounted over the upper face of the bed and in parallel spacement thereto, a carrier slidably adjustable on said rail device, a sighting index mounted on the carrier, a second sighting index mounted above the bed, whereby an object to be marked may be positioned on said bed with the sighting indices, when said carrier is in a given relative adjustment, in visible register respectively and simultaneously with correspondingly spaced apart indices on the object, and a guide for a marking element in fixed relation to one of said sighting indices.

In witness whereof, I hereunto subscribe my name.

ALFRED C. CHRISTOPHERSON.